L. E. ALEXANDER.
MILK PAIL.
APPLICATION FILED JUNE 21, 1917.
1,274,131.
Patented July 30, 1918.
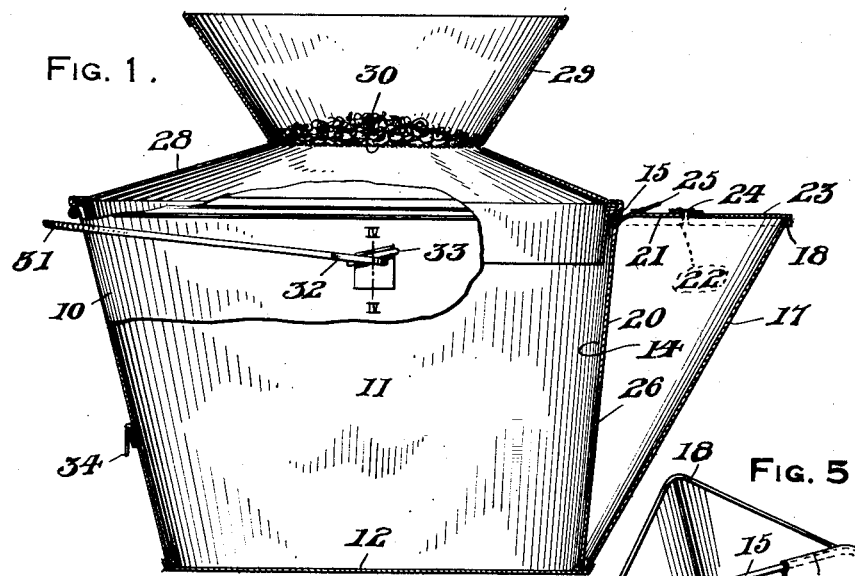
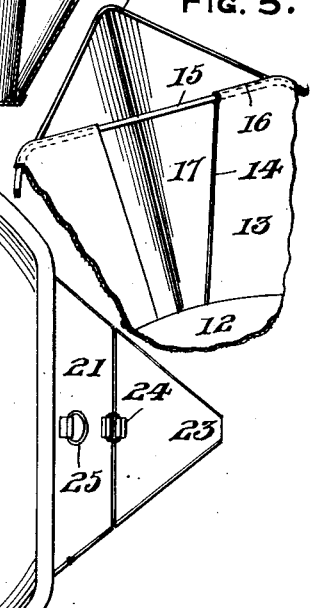
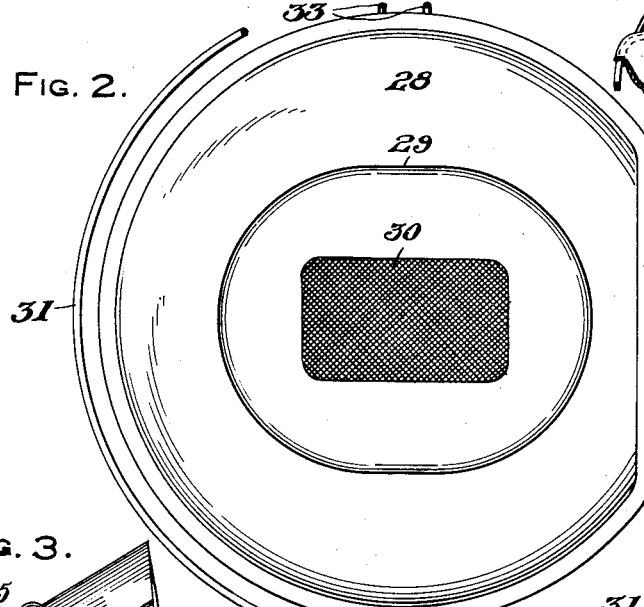
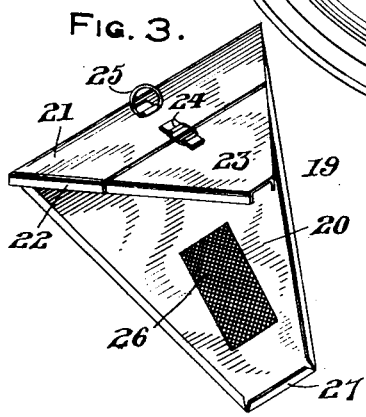
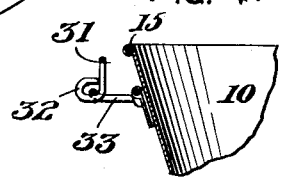
Inventor
Louise E. Alexander
By T. R. A. Bryant
Attorney.

UNITED STATES PATENT OFFICE.

LOUISE E. ALEXANDER, OF SOUTHPORT, NEW YORK.

MILK-PAIL.

1,274,131.

Specification of Letters Patent.  Patented July 30, 1918.

Application filed June 21, 1917. Serial No. 176,058.

*To all whom it may concern:*

Be it known that I, LOUISE E. ALEXANDER, a citizen of the United States of America, residing at Southport, in the county of Chemung and State of New York, have invented certain new and useful Improvements in Milk-Pails, of which the following is a specification.

This invention relates to new and useful improvements in milk pails.

The primary object of the invention is the provision of a milk pail having a removable strainer normally arranged between the milk compartment and the spout and provided with an adjustable cover for the spout, the said strainer and spout cover being readily removable for completely washing and cleaning the device.

A further object of the invention is the provision of a milk pail that is easy and inexpensive to manufacture and one that is provided with means for preventing the splashing of milk as it enters the pail, the structure having a serviceable handle normally maintained horizontally for convenience in grasping when not in use.

A still further object of the invention is to provide a milk pail having a handle and a strainer but the construction being such as not to interfere with the smooth surface of the interior of the container.

In the drawing forming a part of this application, like reference characters designate corresponding parts throughout the several views and—

Figure 1 is a central sectional view of the complete device assembled partially shown in side elevation, Fig. 2 is a top plan view thereof with the handle broken away, Fig. 3 is a perspective view of the strainer member detached, Fig. 4 is a detailed sectional view taken upon line IV—IV of Fig. 1 and Fig. 5 is an interior perspective view showing the spout arrangement for the pail.

Referring more in detail to the drawing the present device consists of a pail 10 formed without side seams, the same consisting of a side wall 11 formed of a single piece of sheet metal, such as tin, slightly tapered downwardly with a bottom 12 secured thereto, the said bottom being circular and the side 11 being substantially annular but with inturned spaced end portions 13 forming a forward flat side portion.

The terminal edges 14 of the metal forming the side wall 11 of the pail being spaced apart forms a substantially V-shaped outlet for the contents of the pail while a reinforcing wire 15 provided within the top bead 16 of the pail spans the upper end of the said outlet 14. An upwardly flaring V-shaped spout 17 is secured to the outer face of the wall 11 substantially inclosing the wall portion 13, the upper edge 18 of the spout being substantially in alinement or in the same plane as the said bead 16.

A strainer member 19 of the form best illustrated in Fig. 3 of the drawing provides a substantially V-shaped plate 20 for seating within the spout 17 in flat engagement with the outer face of the wall portion 13 and bridging the outlet opening in the pail. The side edges of said plate bend to provide retaining flanges 21' which engage the sides of the spout to hold the plate against lateral shifting therein. A cover section 21 also of V-shaped formation projects at right angles from the enlarged end of the plate 20 and normally closes the open top of the spout 18 with depending side flanges 22 overlying the edges 18 of the spout, assisting in maintaining the strainer in its operative position within the spout 17. A hinged forward section 23 is provided at the pointed portion of the cover section 21 the same having hinged connections as at 24 and whereby the cover 23 may be opened when desired while the strainer is in position. A loop 25 is carried by the strainer section 21 for convenience in removing and replacing the strainer in its operative position within the spout 17.

A foraminous portion 26 of any desired dimensions is provided in the plate 20 and may be formed of brass gauze or screen, the same being arranged adjacent the outlet of the pail at 14 and whereby the milk passes through the strainer 26 from the pail and into the spout 17 and is readily poured outwardly upon opening the cover 23. The marginal edges 27 of the plate 20 also assists in retaining the strainer member 19 in its operative position.

A lid 28 is provided for the body portion 10 of the pail, the same conforming in shape to the top of the pail or the bead 16 and being removable at will while a funnel or hopper 29 is centrally carried by the lid 28 for receiving the milk. A strainer 30 is secured between the hopper 29 and lid 28 while cotton or gauze 30 may be arranged thereover for preventing the splashing or spattering of the milk as it forcibly enters the hopper 29 during the milking operation.

A handle or bail 31 is swingingly carried by the pail 10 the same having terminal loops 32 engaging with outwardly projecting links 33 secured exteriorly at opposite points upon the side wall 11, the arrangement being such that the bail 31 will be normally held substantially horizontal by the engagement of the bail with the sides of the links 33. In this manner, the bail 31 is prevented from dropping or swinging toward the bottom of the pail and is maintained in position to be readily grasped by the operator. A further loop or handle 34 is arranged rearwardly of the pail at a point opposite the spout 17 to be grasped in pouring the contents out of the spout 17.

Essential features of the device are the seamless construction of the pail and the smooth interior thereof provided by attaching the links 33 and the handle 34 exteriorly of the side wall 11 instead of employing the usual rivet while the removable strainer member 19 leaves the spout structure capable of being easily cleaned while the lid 28 is removable and provides a non-splashing receiver for the milk. The present embodiment of the invention is believed to be preferable although minor changes may be made therein without departing from the spirit and scope of the invention as claimed.

What I claim as new is:—

A milk pail having a V-shaped opening in its side wall extending the full length thereof, a reinforcing member secured in the upper edge of said pail and bridging said opening to prevent the collapsing of the walls of the latter, a V-shaped spout secured to said pail and surrounding the opening, the depth of said spout being as great as the length of said opening, a removable strainer including a V-shaped plate having parallel side flanges, said plate fitted in said spout bridging the opening of said pail and the flanges of said plate engaging the opposing sides of said spout retaining the plate against lateral movements therein, said plate having an opening registering with the opening of the pail, and a sectional cover hinged to the upper edge of said plate and having its opposite side edges bent downwardly to provide flanges which engage the opposite sides of the spout at the upper edge thereof thereby preventing the movements of said cover with relation thereto during the tilting of the pail.

In testimony whereof I affix my signature.

LOUISE E. ALEXANDER.